United States Patent [19]

Slavin

[11] 4,350,429

[45] Sep. 21, 1982

[54] MATERIAL PROCESSING APPARATUS

[75] Inventor: James A. Slavin, East Windsor, N.J.

[73] Assignee: Noltac Corp., Jericho, N.Y.

[21] Appl. No.: 123,853

[22] Filed: Feb. 22, 1980

[51] Int. Cl.[3] ........................ G03B 3/06; F16K 11/06

[52] U.S. Cl. .................................. 354/299; 354/307; 354/323; 354/324; 137/554; 137/625.11

[58] Field of Search .............. 354/307, 323, 324, 299, 354/325, 326; 137/554, 625.11, 625.41, 625.46, 625.18; 118/429

[56] References Cited

U.S. PATENT DOCUMENTS

| | | | |
|---|---|---|---|
| 3,508,483 | 4/1970 | Weider et al. | 354/323 |
| 3,570,314 | 3/1971 | Wagner | 137/625.11 |
| 3,752,167 | 8/1973 | Makabe | 137/625.11 |
| 3,868,715 | 2/1975 | Slavin | 354/298 |
| 3,892,197 | 7/1975 | Kinney et al. | 118/429 |
| 3,972,350 | 8/1976 | Pickett | 137/625.11 |

*Primary Examiner*—L. T. Hix

*Assistant Examiner*—Alan Mathews

*Attorney, Agent, or Firm*—Nolte and Nolte

[57] ABSTRACT

A system for selectively dispensing and/or mixing or otherwise utilizing materials contained in respective storage tanks, including a material conveyance means, such as a pump, and a specialized selector valve programmably controllable to supply the materials to one or more processing containers in desired quantities and in a desired sequence.

41 Claims, 13 Drawing Figures

MATERIAL PROCESSING APPARATUS

BACKGROUND OF THE INVENTION

This invention relates to improvements in systems for automatically handling fluids, including reagents, mixture components, or other such fluids. The term "fluid" as used herein is intended to mean any substance that can be pumped, or conveyed through a tube, including slurries or fine powders which behave as fluids.

The most pertinent prior art presently known to applicant is his own U.S. Pat. No. 3,868,715.

SUMMARY

According to this invention, a pump and an improved selector valve means are arranged to direct selectively the flow between the storage tanks of one or more substances and one or more processing containers where the substances may be utilized sequentially or intermixed, as required. The pump may be reversible to remove used substances from the processing container or containers, for return to respective storage tanks for subsequent re-use, or for delivery to a sump or the like for disposal as waste. Two selector valves may be provided, one for selecting a storage tank and one for selecting a processing container, which may also be a tank. This arrangement enables separate operations, such as multiple batch photographic developing, to take place concurrently or in overlapping time periods in different processing containers. Additionally, several valves may be interconnected to perform more complex operations.

For certain applications, one or more of the processing and/or storage tanks may be provided with means for excluding ambient light and air, and vent means for releasing gas from the tank. A processing tank may also include means for supplying dry and/or heated air to material such as photographic film in the tank.

The improved selector valve includes a base plate provided with a first aperture or port and a plurality of second ports disposed at points on a circle concentric with the first port, and a fluid conducting rotor arm extending radially from the first port and having a vertically articulable extension adapted, when lowered, to engage one of the second ports. A motor is arranged to rotate the rotor arm into alignment with the selected one of the second ports. Means are included for sensing such alignment, and for driving the extension downward into engagement with the second port. Further means are provided for sensing lack of such engagement, and preventing application of fluid in event engagement is not present.

For processes in which temperature is a factor, one or more of the storage tanks and/or processing containers may be immersed in a temperature-control bath, comprising a tank containing a working fluid, such as water, with heating and/or cooling means controlled by a temperature sensing device to maintain the bath at the desired temperature. The bath is provided with means for continually circulating the working fluid.

One or more of the processing containers may be provided with agitator means to maintain homogeneity of the fluid during processing. Fluid agitation is preferably accomplished by an ultrasonic generator. The transducer could be driven by a generator producing a signal having a complex waveform, in order to prevent formation of standing waves in the processing tank. Such standing waves are objectionable, for example, in photographic or x-ray processing processes, since they tend to produce streaks on the film.

The entire system, including selector valves, pump, air supply, temperature control, and agitator means is preferably controlled by a programmable digital device such as a microprocessor, which may be incorporated with a keyboard or other suitable input means as a part of the structure of the apparatus, or by a physically separate device such as a computer or mini-computer with suitable peripheral means for sensing conditions in the processing apparatus and starting and stopping the various functions.

DESCRIPTION OF PREFERRED EMBODIMENTS

Figure 1:
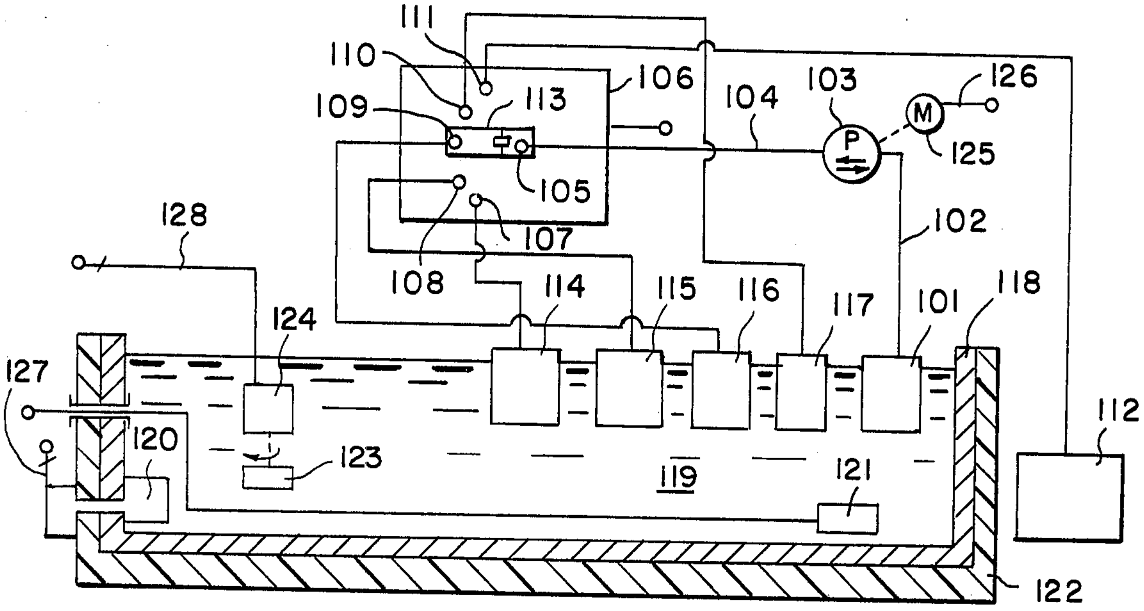
FIG. 1 is a schematic diagram of a fluid processing system according to the invention.

Referring to FIG. 1, a processing container 101, illustrated in this case as a tank, is connected by a fluid conduit 102 to a reversible pump 103, which in turn is connected by a conduit 104 to a first or common port 105 of a selector valve 106. Pump 103 is arranged to be driven by a reversible electric motor 125, which is controlled by signals from the control unit by line 126. Valve 106 is provided with a plurality of second ports 107–111 and a fluid conducting arm 113, rotatable about the common port 105 to selectively connect the common port 105 to any one of the second ports 107–111. In the valve position of FIG. 1, ports 105 and 109 are in fluid communication. The structure of valve 106 will be described later in more detail. The pump 103 may be a flexible impeller pump or a rotary vane pump.

Ports 107–110 are connected by respective conduits to fluid storage tanks 114–117, each adapted to contain a supply of a fluid to be utilized in the processing container 101. Port 111 of valve 106 is connected to a sump or waste receptacle 112. This sump might also be a container to be filled with the mixture in the processing tank. When the apparatus is to be used in temperature sensitive operations, such as photographic processing, tanks 101 and 114–117 may be immersed in a temperature-control bath comprising a tank 118 containing a working fluid 119, such as water, maintained at the desired temperature.

To this end, heating/cooling means, such as a Peltier effect thermoelectric device 120 is immersed in the tank and connected to be controlled by a temperature sensing device 121, which may be a thermistor, a thermostat, or an electrically connected thermometer. The exterior of the tank 118 may be covered by a layer 122 of thermal insulating material. An agitator 123 is arranged to be driven by a motor 124 to continually circulate the working fluid 119. Both the device 120 and the motor 124 may be under the control of the control unit via lines 127 and 128, respectively.

The apparatus of FIG. 1 is useful for a variety of purposes, from simple mixing, as in the preparation of beverages, to processes involving a series of chemical reactions, such as in the development of photographic film. The selector valve 106 and pump 103 are actuated and energized in a predetermined timed sequence to supply the several fluids as needed to the processing tank, to return reusable fluids to the respective storage tanks, and to discard nonreusable fluids to the sump, or to fill containers with the mixture in the processing tank.

The pump 103, must be a self-priming pump and must be capable of delivering fluids in either direction. The rotary vane pump is suitable for such use, as is a flexible impeller pump.

Because the system of FIG. 1 is intended to be controlled by a programmed control module, the several electrical units, such as the valve 106, the pump motor 125, the agitator driver 124 and the heater/cooler 120 are shown having electrical connections for connection to the control module.

Figure 2:
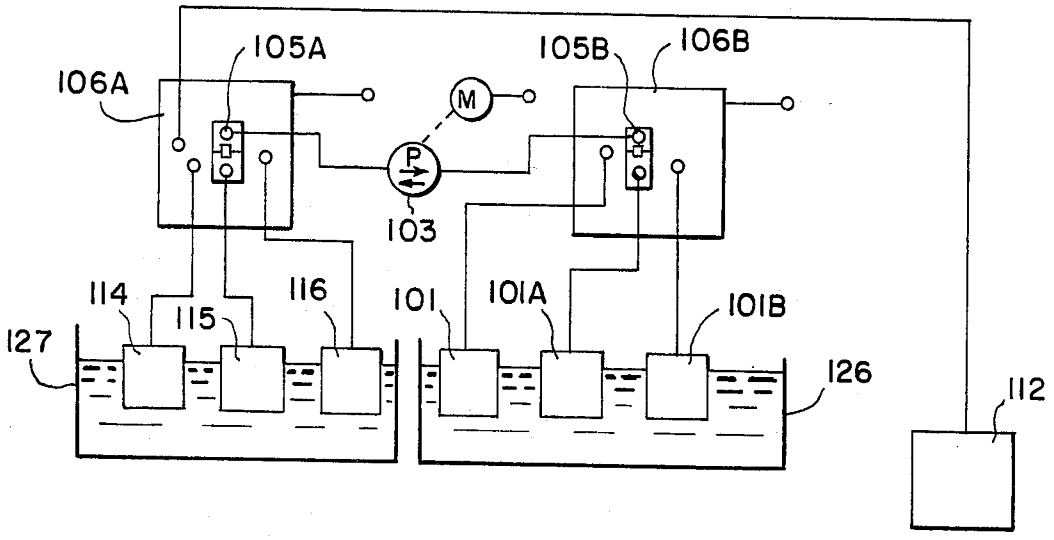
FIG. 2 is a modification of the system of FIG. 1.

Referring to FIG. 2, two or more fluid processing operations may be carried out contemporaneously by providing two selector valves 106A and 106B, each similar or identical to valve 106 of FIG. 1. The first or common ports 105A and 105B are connected to each other through the pump 103. A plurality of processing tanks 101, 101A and 101B are connected to respective second ports of valve 106B. Fluid supply tanks 114–116 and any others, not shown, as needed, are connected to respective second ports of valve 106A. A sump 112 may be provided as in the embodiment of FIG. 1.

When operations are to be performed which are temperature dependent, fluid baths may be employed, and separate baths may be added as required or all processing and storage tanks may be contained in the same bath. In FIG. 2, a separate bath shown schematically at 126, is provided for the processing tanks 101, 101A, and 101B. Similarly, a separate bath 127 may be provided for the supply tanks 114, 115, 116. It is understood that as many baths may be supplied as separate temperatures are required or that all processing and storage tanks may be contained in the same bath. Each bath can have all the elements of the bath shown in detail in FIG. 1.

The operation of the apparatus of FIG. 2 is similar to that of FIG. 1, with the additional capability that the processing tanks 101, 101A and 101B, and any number of others, not shown, may be supplied in any desired sequence with any of the several fluids or mixtures thereof. Fluids may also be removed from the processing tanks in any sequence for return to the appropriate storage tanks, or disposal, or for filling containers, as in paint or beverage mixing. One of the storage tanks may contain water or other cleaning fluid for flushing the conduits, valves and tanks to prevent contamination.

Figure 3:
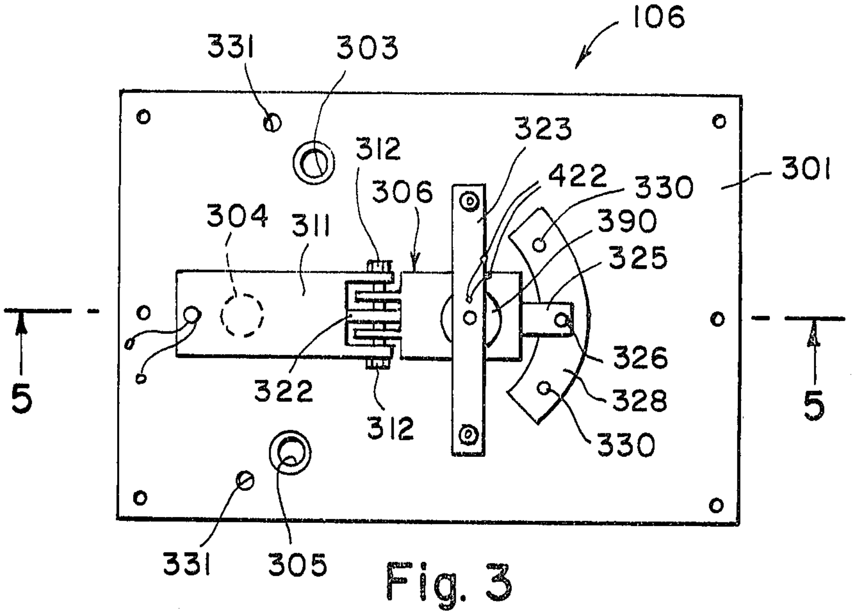
FIG. 3 is a top plan view of a selector valve used in the systems of FIGS. 1 and 2.
Figure 4:
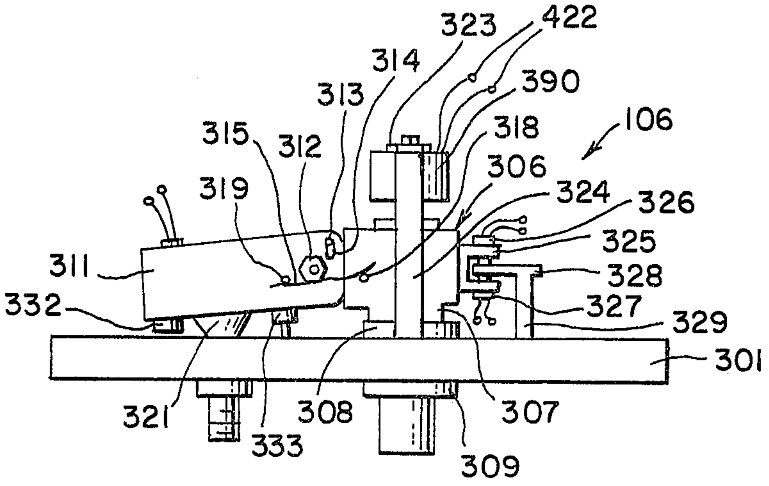
FIG. 4 is a side elevational view of the valve of FIG. 3.
Figure 5:
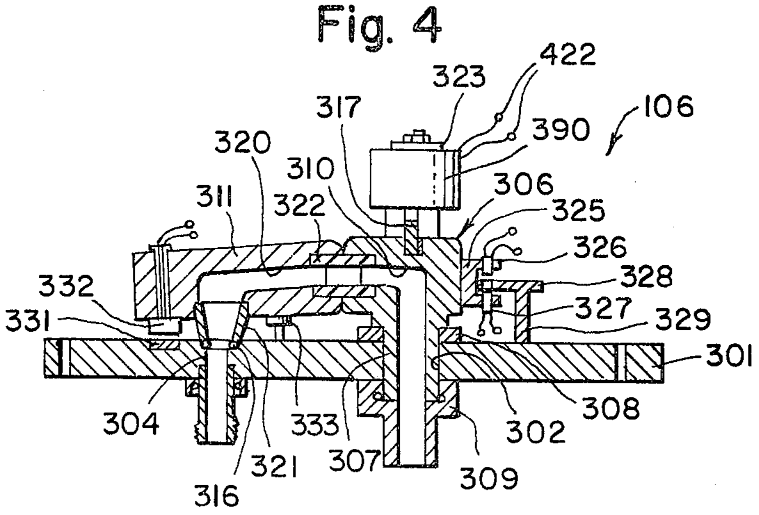
FIG. 5 is a side elevational view in cross section, taken along line 5—5 of FIG. 3.

Referring now to FIGS. 3, 4 and 5, the selector valve 106 of FIG. 1 includes a base plate 301 provided with a first aperture 302 and a plurality of second apertures 303, 304 and 305 disposed on the circumference of a circle concentric with aperture 302. A rotor arm assembly 306 is provided with a downwardly extending tubular member 307 rotatably mounted in aperture 302. Longitudinal motion of member 307 is restrained by a shoulder on the arm abutting a collar 308 disposed above the plate 301 and a collar 309 secured to it below plate 301. Collar 309 can include seal means, such as an O-ring, so that a fluid-tight seal is provided. The collar 309 provides a suitable connection to the appropriate fluid tube, not shown. Arm 306 contains a fluid passage 310 to the upper end of tubular member 307 extending radially outward therefrom.

The rotor arm assembly 306 includes a radial outward extension 311 mounted on hinge pins 312 for vertical articulation with respect to the inner, or right hand part of the arm. The extent of vertical motion is limited by a pin 313 on the inner part and a slot 314 on the extension 311. Each hinge pin 312 supports a spring 315 with tails engaging pins 318 and 319 on the inner and outer arm members to bias the extension 311 to its upward position. Extension 311 contains a fluid passage 320 that extends downwardly at its outer end and terminates in a fitting 321 beveled at its lower end to form a fluid tight connection with any of the second apertures 303–305. The second apertures contain a seal means 316 which cooperates with the lower surface of the tapered element 321 to form a fluid-tight seal. In this manner a seat is formed in the plate 301 to accomodate the beveled end of fitting 321.

The radially inner end of passage 320 is coupled to the outer end of passage 310 by a flexible tube 322. This tube 322 permits relative motion between the portions of the arm assembly 306.

A motor 390 is secured on a shelf 323 supported above the inner end of rotor arm 306 by uprights 324 from the base plate 301. The motor 390 may be an electrically operated motor or a pneumatic or hydraulic motor. The motor shaft 317 is coupled to the rotor arm so as to rotate it about a vertical axis concentric with the tubular member 307 when the motor is energized. Although FIG. 5 is a cross sectional view taken along line 5—5 of FIG. 3, the motor 390 has not been shown cross section in the interest of clearness and simplicity. The motor 390 can be a conventional stepping motor, a rotary solenoid-based stepping motor, or a synchro motor. The rotation of motor 390 is under the control of the control unit via signals on leads 422.

The right-hand end of arm 306 carries a bifurcated tail 325 containing a downwardly directed light source 326 in its upper leg, and an upwardly looking light detector 327 in its lower leg. An acurately shaped mask member 328 supported on uprights 329 extends between source 326 and detector 327. The mask is provided with transparent regions or apertures 330 disposed to allow light to reach the detector 327 only when the rotor arm 306 is in a position such that fitting 321 is in alignment with one of the plurality of second apertures 303–305. This alignment is sensed by the detector 327 and the information fed to the control unit. It is understood that this position detection function could be achieved by any of several different approaches. For example, instead of sensing light transmission, light reflection could be used and the detector could be mounted along side of the light source. Alternatively, a microswitch and detent arrangement could be used, as could a magnetic sensor arrangement. Additionally, when employing a steping motor, it is not necessary to sense valve alignment since the position of the rotor will be known by sensing the indexing of the stepping motor.

A series of permanent magnets 331 are disposed on plate 301, each aligned with and adjacent to one of the second apertures. An electromagnet 332 is mounted near the outer end of extension 311 so that its lower end faces one of the permanent magnets 331 when the rotor arm is positioned with tapered element 321 in alignment with one of the second apertures. When the electromagnet is energized in one polarity, it is attracted by the adjacent permanent magnet 331 and overcomes the force of the springs 315 and pulls the extension 311 downwardly, in order to engage firmly the tapered element 321 with the seat of the corresponding second aperture. When energized in the opposite polarity, the electromagnet 332 is repelled by the permanent magnet 331, thereby assisting the springs 315 to raise extension 311 and disengage tapered element 321 from sealed engagement with the seat of the second aperture. The invention is assembled such that there is sufficient clearance between the permanent and electromagnets so that they never touch. This permits them to center on each other, ensuring alignment of element 321 with the second aperture. Although FIG. 5 is a cross-sectional view, the electromagnet 332 has not been shown in cross-section, in the interest of clarity and simplicity.

A plunger actuated switch 333 of known design is mounted on the lower side of extension 311, with its plunger pointed down so as to be pushed in by the base plate 301, when extension 311 is in its lower position. This closes the switch 333. The plunger is released when the extension 311 is in its upper position, to open the switch 333. Switch 333 can be a micro-switch or any other type of simple spring-loaded switch. This switch 333 is an important element in the embodiment being described, since it is absolutely necessary to know whether the extension 311 is in its lowered position, so that the pump will not be energized unless sealing contact has been made.

Figure 6:
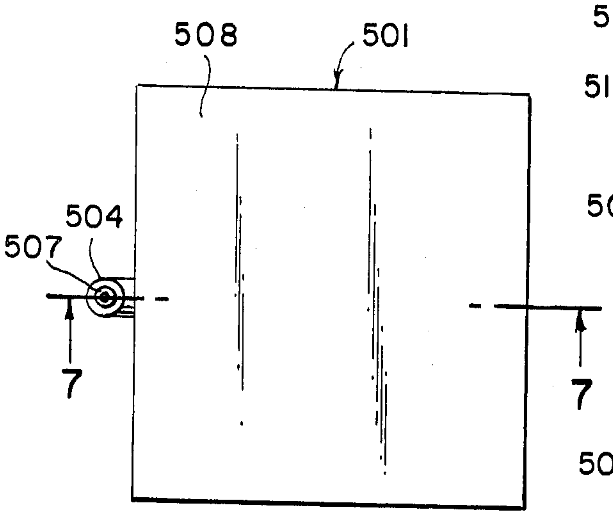
FIG. 6 is a top plan view of a tank, used in the embodiment of FIGS. 1 or 2.
Figure 7:
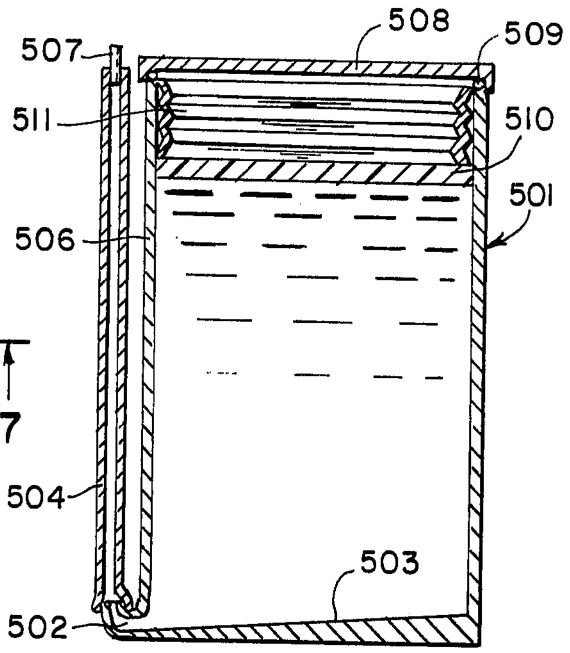
FIG. 7 is a sectional view in elevation of the tank of FIG. 6 taken along line 7—7.

Referring now to FIGS. 6 and 7, a fluid storage tank 501, typically of tanks 114–117 of FIG. 1, is provided with an opening 502 in one of its side walls at the bottom of the tank. The bottom wall 503 may slope slightly downward toward the opening 502 to facilitate removal of all fluid contained in the tank 501. A tube 504 is connected at its lower end to the interior of the tank through opening 502, and extends vertically up the outside of side wall 506, terminating near the top of the tank in a fitting 507 for attachment to a fluid conduit.

The tank 501 is provided with a removable light-tight airtight cover 508 with a resilient seal 509 for engagement with the peripheral upper edges of the tank. To further protect fluid in the tank from exposure to air, a float 510 is arranged to ride on the upper surface of the fluid. A bellows 511 is secured to the upper surface of float 510 and the inside surface of cover 508.

Figure 8:
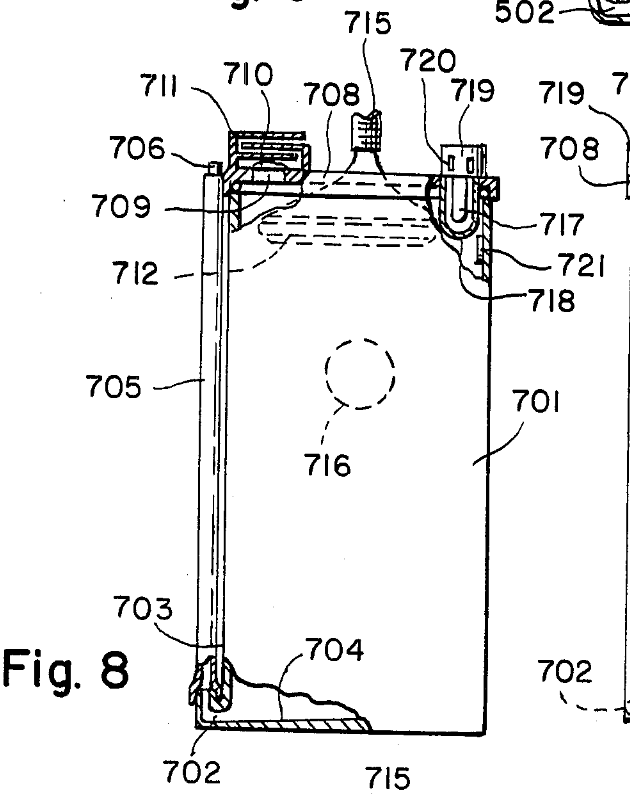
FIGS. 8, 9, and 10 are front, side and top views, respectively, of a processing tank for use in the systems of FIGS. 1 and 2.
Figure 9:
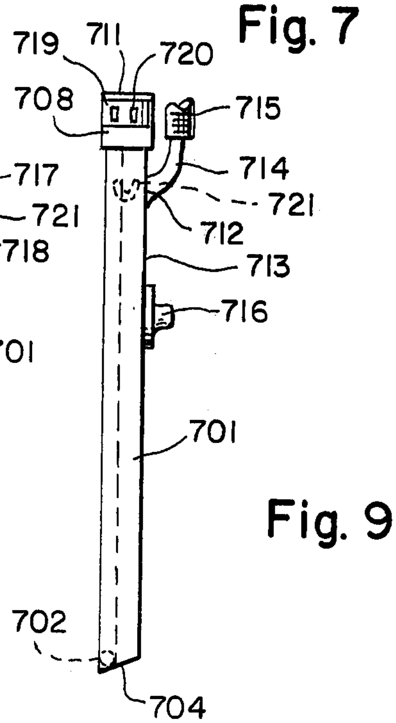
Figure 10:
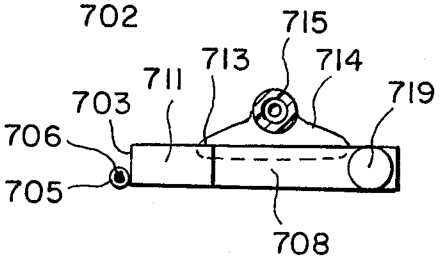

Referring to FIGS. 8, 9, and 10, a processing tank 701, which, in this embodiment is particularly adapted for the processing of photographic film, is provided with an opening 702 in wall 703 at the bottom of the tank. The bottom wall 704 slopes downward toward the opening 702 as shown. A tube 705 is connected at its lower end to the interior of the tank through opening 702, and extends vertically up the outside of wall 703, terminating near the top of the tank in a fitting 706 for attachment to a fluid conduit.

The tank is provided with a removable light-tight cover 708 which is preferably gas-tight, except for a vent 709 with a hinged cover 710. Cover 710 acts as a check valve which, when closed, prevents entry of air to the tank, but when opened by an increase in pressure within the tank, releases gas from the tank. A light baffle arrangement 711 prevents entry of light when the valve is open.

For use in processes that require exposure to light, an electric lamp 717 with a transparent cover 718 is provided inside cover 708. The lamp is mounted in a socket 719 provided with cooling vents 720.

A horizontally elongated opening 712 is provided near the top of wall 713 for the admission of air or other gas under pressure from a nozzle 714 connected to a hose 715. The transducer 716 of an ultrasonic generator is secured to wall 713 for agitating the fluid in the tank during certain processing operations. The transducer 716 may be an electromagnetic, magneto-strictive, or piezoelectric device of known type. A hook 721 is provided to hang photographic or X-ray film frames on racks.

Figure 11:
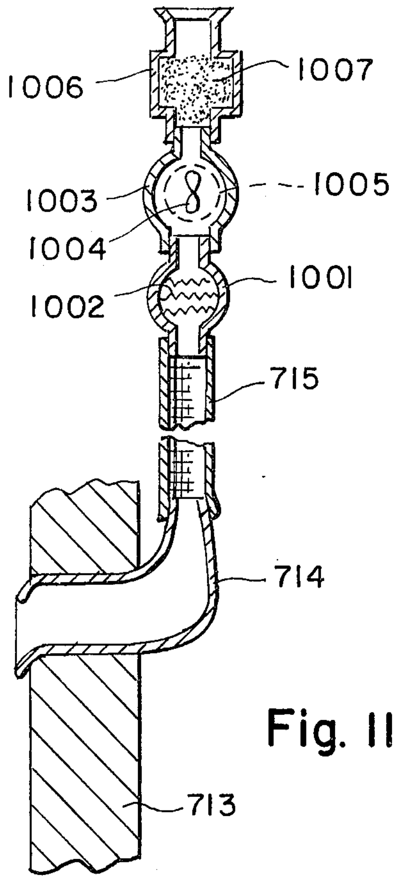
FIG. 11 shows apparatus for blowing dried and/or heated air into the tank of FIGS. 8, 9, and 10.

Referring to FIG. 11, hose 715 is connected through an enclosure 1001 containing an electric heating element 1002 to a blower 1003 with an impeller 1004 arranged to be driven by an electric motor 1005. External air is admitted to the blower through a container 1006 of dessicant 1007 which may be, for example, a particulate silica gel or a zeolite.

Figure 12:
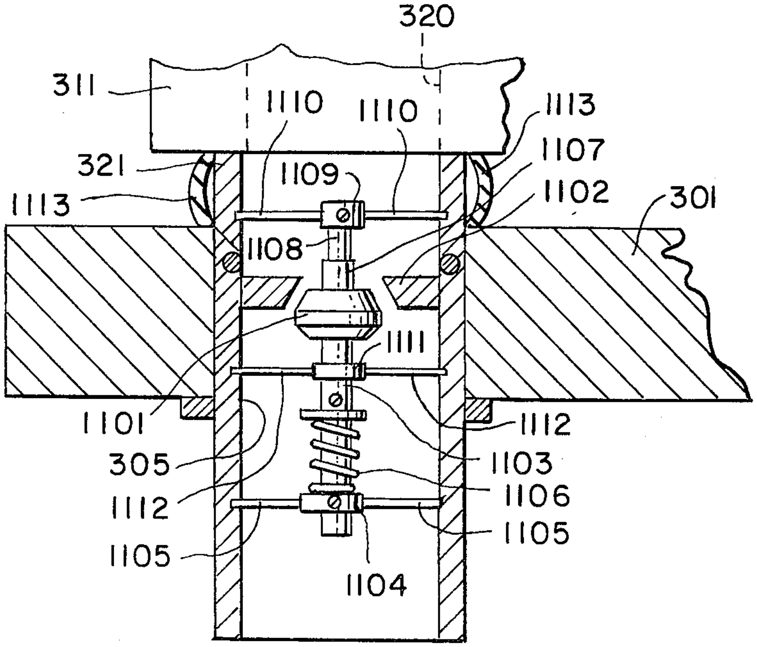
FIG. 12 is a partial section of a poppet valve and actuator arrangement for use with the selector valve of FIGS. 3, 4, and 5.

Referring to FIG. 12 one or more of the second ports or apertures of the selector valve of FIG. 3, for example 305, may be provided with a poppet valve including conical member 1101 cooperating with a valve seat 1102. Member 1101 is supported on a stem 1103 extending downwardly and slidably through a bushing 1104 supported on struts 1105. A coil spring 1106 surrounding stem 1103 urges member 1101 toward its upward, valve closing position.

A second stem 1107 extends upwardly from member 1101 for engagement with a valve operating pin 1108 secured in a collar 1109 supported inside fitting 321 by struts 1110. When the selector valve arm extension 311 is lowered, as shown, pin 1108 forces stem 1107 downward, opening the valve. Another bushing 1111 and struts 1112 arrangement maintains the alignment of the valve stem 1103 during actuation. A resilient boot 1113 surrounds fitting 321 to prevent entry of ambient air while the valve is partially open and the beveled lower end of fitting 321 is not in engement with the o-ring seal in the aperture.

Figure 13:
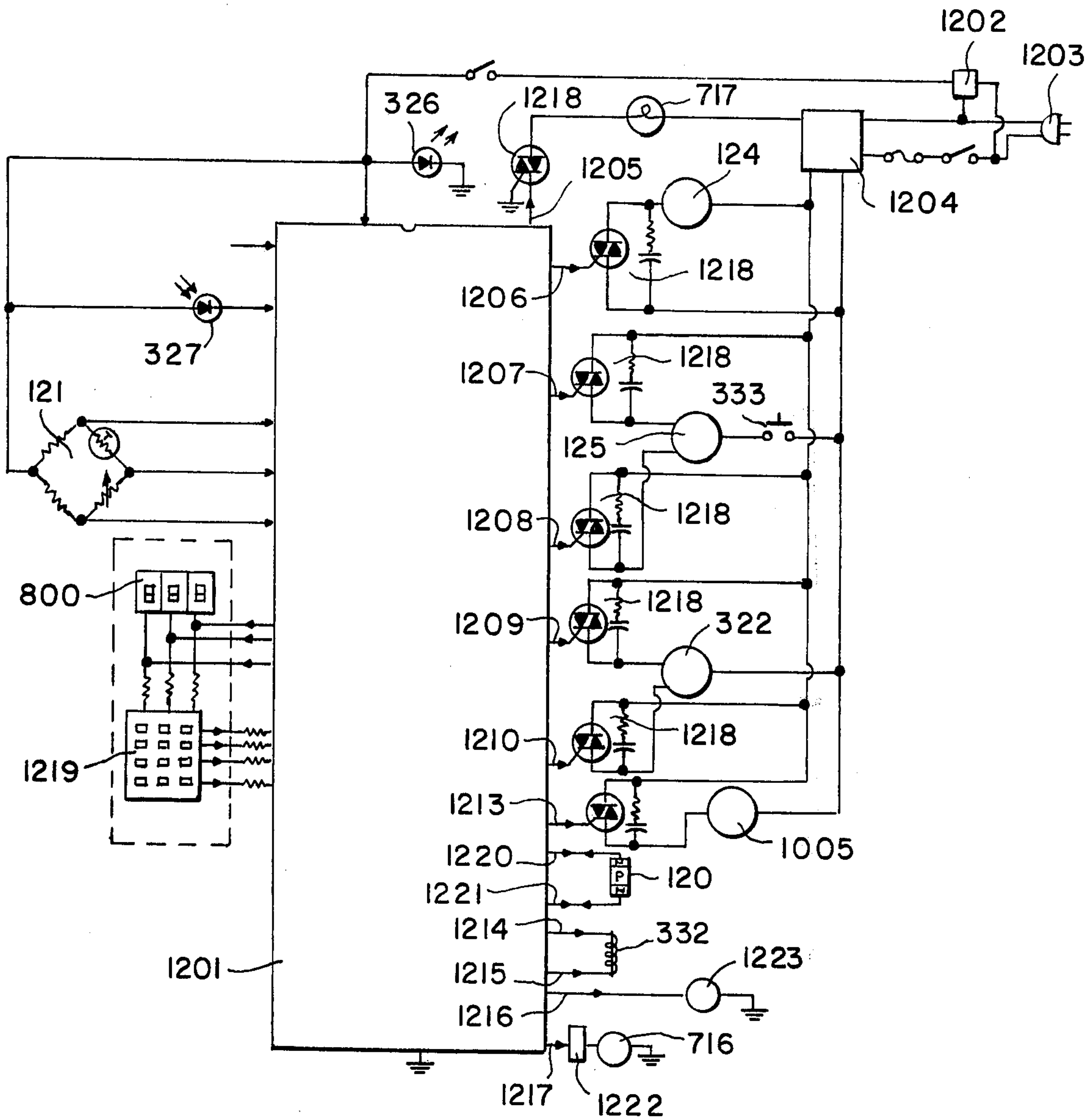
FIG. 13 is a schematic diagram of the electrical circuits and control apparatus for the systems of FIGS. 1 and 2.

Referring to FIG. 13, a programmable digital device 1201, which may be a computer or an assembly including one or more microprocessors, is arranged to control energization of respective electric motors driving the mechanisms of the described systems, and energization of other electrically operated elements thereof. The device 1201 is itself energized by a regulated power supply 1202 adapted to be connected to the usual a-c line by a plug 1203. A separate power supply 1204 for the various motors and other elements may also be connected to plug 1203.

Device 1201 includes a clock-signal generator which, in accordance with a suitable program entered in the device 1201, provides electrical outputs or strobes at the appropriate times on respective output lines 1205–1217. The device 1201 may be programmed by any conventional means, such as a manually operable keypad 1219. An illuminated digital readout 800 may also be employed which will provide a visual indication of the information manually fed in by keypad 1219. This readout unit 800 can also be used to provide information about certain malfunction states present in the system.

Lines 1214 and 1215 are connected to electromagnet 332 of FIG. 3, and are energized in either one polarity or the other, depending upon whether the extension 311 of the selector valve rotor arm is to be raised or lowered.

Lines 1207 and 1208 supply inputs to respective relay devices 1218 for energizing the reversible pump motor 125 to run in the selected direction. Switch 333 prevents energization of motor 125 except when the selector valve arm is in engagement with one of the second ports.

Line 1206 controls fluid bath agitator motor 124 by way of a relay device 1218. Line 1205 is similarly arranged to control processing tank lamp 717.

Temperature sensor 121 is shown as a conventional thermistor bridge circuit cproviding an input to digital device 1201. A desired set-point temperature may be entered by keypad 1219. Output lines 1220 and 1221 energize Peltier device 120 in one polarity for cooling and in the opposite polarity for heating the temperature control bath. Line 1217 operates a complex wave form generator 1222 driving the ultrasonic wave transducer 716 for agitating the contents of the processing tank of FIG. 9. The control module might also operate transducer 716 directly, via line 1217. Line 1216 energizes an alarm device 1223 when a process is completed or some condition occurs requiring the attention of an operator. The alarm condition can also be indicated on the digital readout device 800.

It is understood that the foregoing is presented by way of illustration only and is not intended to limit the scope of the present invention, except as set forth in the appended claims. For example, when using a rotary vane pump, which is capable of pumping both fluids and gases, one of the secondary ports in the valve may be connected to a source of air for drying the material in the processing tank. In this manner the pump which is used for fluid transfer is also used to pump in drying air.

What is claimed is:

1. Apparatus, comprising (a) a plurality of material storage tanks, each adapted to contain a supply of a respective material, (b) selector valve means having a first port and a plurality of second ports and means for establishing a connection between said first port and any one of said second ports, (c) drive means connected to said selector valve means for actuating said valve to connect said first port to any one of said second ports, (d) conduit means connecting said storage tanks to respective ones of said second ports, (e) further conduit means connected to carry materials to a processing container, (f) a material conveyance means connected between said first port and said further conduit means, (g) means connected to said drive means for selecting one of said second ports for connection to said first port, (h) temperature control bath containing at least one of said material storage tanks, and (i) means for preventing operation of said material conveyance means except when said selector valve has established a connection between said first port and a selected one of said second ports.

2. The apparatus of claim 1, wherein said processing container comprises a processing tank connected to said further conduit means and provided with a gas-tight, light-tight, removable cover.

3. The apparatus of claim 2, wherein said cover is provided with a vent for releasing gas from said processing tank, and a check valve comprising a hinged cover over said vent which, when closed, prevents ambient air from entering said processing tank but, when lifted by an increase in pressure within said processing tank, provides a passage for releasing gas from said processing tank.

4. The apparatus of claim 3, further including a light baffle adjacent said vent disposed to prevent entry of light through said vent to said processing tank.

5. The apparatus of claim 2, wherein said processing tank is provided with an opening near its top, further including a source of gas under pressure and means for conducting gas from said source to said processing tank through said opening.

6. The apparatus of claim 5, wherein said gas is air and said source of gas under pressure is a blower.

7. The apparatus of claim 5, wherein said source is connected to a container of desiccant.

8. The apparatus of claim 5, further including means for heating the gas supplied by said source.

9. The apparatus of claim 6, wherein said blower is connected in series to a container of desiccant and to a heater means to provide air which has been dried and heated.

10. The apparatus of claim 7, wherein said desiccant is particulate silica gel.

11. The apparatus of claim 7, wherein said desiccant is a zeolite.

12. The apparatus of claim 2, further including means for illuminating the interior of said processing tank.

13. Apparatus, comprising;

(a) a plurality of material storage tanks, each adapted to contain a supply of a respective material, and wherein at least one of said storage tanks is constructed with one point in the bottom lower than any other point of the tank, and said tank if provided with a material conduit extending generally vertically outside the tank and communicating at its lower end with the interior of said tank at said point, (b) selector valve means having a first port and a plurality of second ports and including means for establishing a connection between said first ports and a selected one of said second ports, (c) drive means connected to said selector valve means for actuating said valve to connect said first port to any one of said second ports, (d) conduit means connecting said storage tanks to respective ones of said second ports, (e) further conduit means connected to carry materials to a processing container, (f) a material conveyance means connected between said first port and said further conduit means, (g) means connected to said drive means for selecting one of said second ports for connection to said first port, (h) means for preventing operation of said material conveyance means except when said selector valve has established a connection between said first port and a selected one of said second ports.

14. Apparatus, comprising;

(a) a plurality of material storage tanks each adapted to contain a supply of a respective material, (b) a first selector valve means having a first port and a plurality of second ports and means for selectively connecting said first port of said first selector valve means to any one of said second ports of said first selector valve means, (c) conduit means connecting said storage tanks to respective ports of said first selector valve means, (d) a plurality of processing tanks, wherein at least one of said processing tanks is provided with an airtight removable cover having a vent for releasing gas from said tank, (e) a second selector valve means having a first port and a plurality of second ports, and means for selectively connecting said first port of said second selector valve means to any one of said second ports of said second selector valve means, (f) conduit means connecting said processing tanks to respective second ports of said second selector valve means, (g) a material conveyance means connected between said first port of said first selector valve means and said first port of said second selector valve means, and (h) control means connected to said first and said second selector valve means and to said material conveyance means for selectively connecting said storage tanks and said processing tanks and for causing said material conveyance means to convey material between said selected storage tank and a selected processing tank.

15. The apparatus of claim 14, wherein said material conveyance means is a pump.

16. The apparatus of claim 14, wherein said pump is a flexible impeller pump.

17. The apparatus of claim 14 wherein said pump is a rotary vane roller pump.

18. The apparatus of claim 14, further including means for illuminating the interior of said at least one processing tank provided with an airtight removable cover.

19. The apparatus of claim 14, further including a check valve comprising a hinged cover over said vent which, when closed, prevents air from entering said at least one processing tank provided with an airtight cover but, when lifted by an increase in pressure within said at least one processing tank provided with an airtight cover, provides a passage for releasing gas from said at least one processing tank provided with an airtight cover.

20. The apparatus of claim 14, further including a light baffle adjacent said vent disposed to prevent entry of light through said vent to said at least one processing tank provided with an airtight removable cover.

21. The apparatus of claim 14, wherein at least one of said plurality of processing tanks has one point in the bottom of said tank lower than any other part of the tank, and said at least one tank is provided with a material conduit extending generally vertically outside the tank and communicating at its lower end with the interior of said tank at said point.

22. The apparatus of claim 14, wherein at least one said processing tanks provided with an airtight removable cover is provided with an opening near its top, further including a source of gas under pressure and means for conducting gas from said source to said tank having an opening through said opening.

23. The apparatus of claim 22, wherein said gas is air and said source of gas under pressure is a blower.

24. The apparatus of claim 22, wherein said source is connected to a container of desiccant.

25. The apparatus of claim 22, further including means for heating the gas supplied by said source.

26. The apparatus of claim 23, wherein said blower is connected in series to a container of desiccant and to heater means to provide air which has been dried and heated.

27. The apparatus of claim 24, wherein said desiccant is particulate silica gel.

28. The apparatus of claim 24, wherein said desiccant is a zeolite.

29. The apparatus of claim 14, further including a temperature control bath containing at least one of said fluid storage tanks and at least one of said material processing tanks.

30. The apparatus of claim 1 or 14, further including a temperature control bath for one or more of the material storage tanks and/or material processing tanks, comprising (a) a temperature bath tank containing a working fluid, (b) means for continually circulating said working fluid, (c) means for sensing the temperature of said working fluid, (d) means responsive to said sensing means for heating said working fluid when its temperature is below a preset point and cooling said fluid when its temperature is above a preset point.

31. The apparatus of claim 30, wherein said sensing means is a thermistor.

32. The apparatus of claim 30, wherein said temperature bath tank containing a working fluid is provided with heat insulating means.

33. The apparatus of claim 30, wherein said means for heating and cooling said working fluid is a Peltier effect thermoelectric device.

34. The apparatus of claim 30, further including programmable digital means for controlling said preset point of said temperature sensing means.

35. The apparatus of claim 14, wherein at least one of said material processing tanks is provided with ultrasonic generator means for agitating the fluid contained in said at least one material processing tank.

36. The apparatus of claim 35, further including a complex waveform generator for driving said ultrasonic generator.

37. The apparatus of claim 35, further including programmable digital means for energizing said complex waveform generator.

38. The apparatus of claim 14, further including programmable digital means for controlling the operation of said selector valve means and said material conveyance means.

39. The apparatus of claim 38, wherein said digital means is microprocessor chip.

40. The apparatus of claim 14, wherein at least one of said material storage tanks is constructed with one point in the bottom lower than any other point in the material storage tank, and said material storage tank is provided with a material conduit extending generally vertically outside the material storage tank and communicating at its lower end with the interior of said material storage tank at said point.

41. The apparatus of claim 14, wherein at least one of said material storage tanks is provided with an airtight, light-tight cover.

* * * * *